Sept. 10, 1946.  H. R. EBERLE  2,407,407
SHAKER CONVEYER
Filed Dec. 26, 1944  2 Sheets-Sheet 1

INVENTOR
Herman R. Eberle
Clarence F. Poole
ATTORNEY

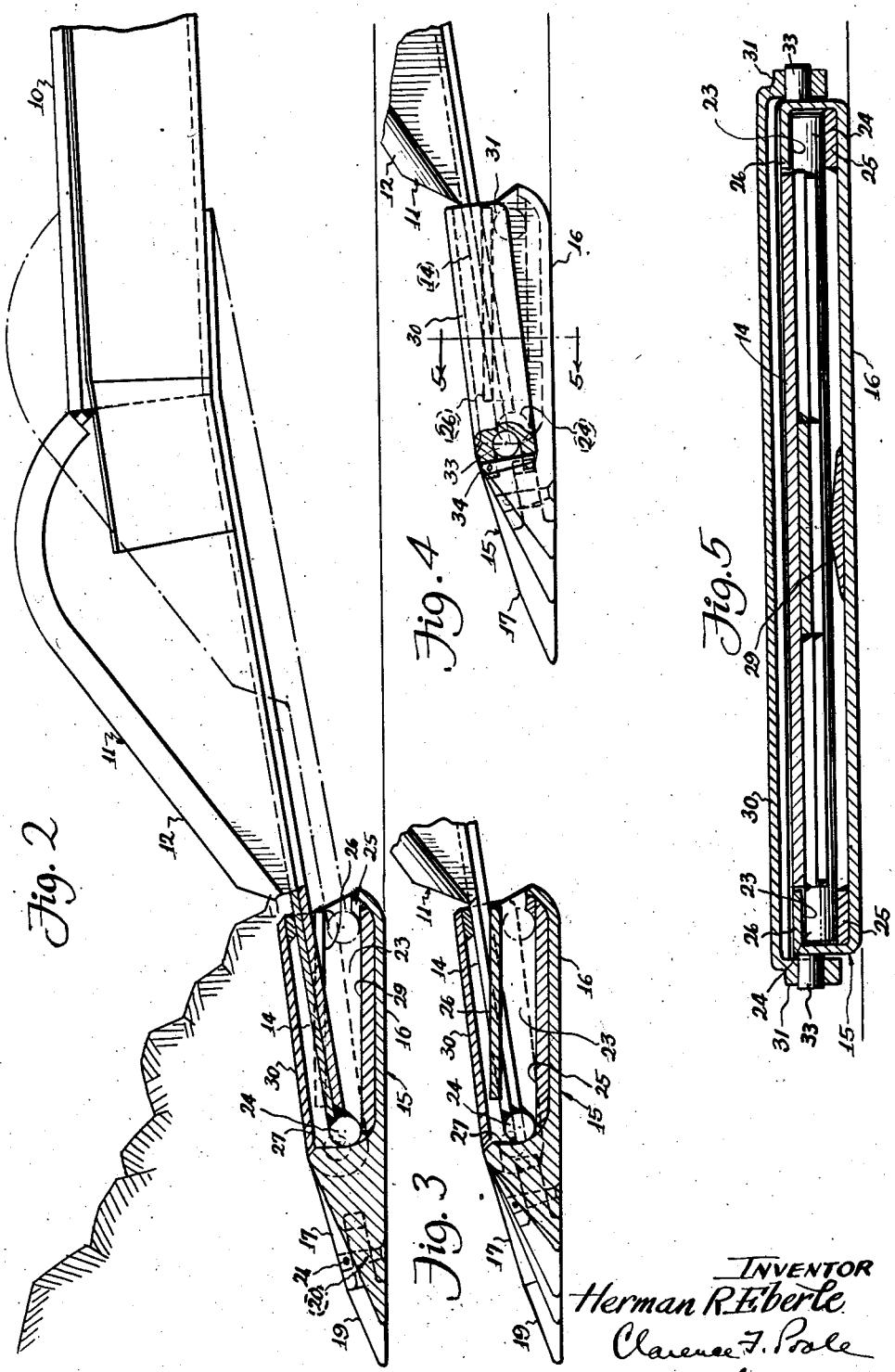

Patented Sept. 10, 1946

2,407,407

UNITED STATES PATENT OFFICE 2,407,407

SHAKER CONVEYER

Herman R. Eberle, Chicago, Ill., assignor to Goodman Manufacturing Company, Chicago, Ill., a corporation of Illinois Application December 26, 1944, Serial No. 569,774

9 Claims. (Cl. 198—14)

This invention relates to improvements in shaker conveyers, and more particularly to improvements in the pick-up end of an extensible trough of a shaker conveyer, commonly known as a "duckbill."

Heretofore difficulty has been encountered in loading rock or ore with an extensible trough of a shaker conveyer having a shovel on its forward end. This is due to the increased weight of the rock or ore over coal, the abrasiveness of the material, and the fact that the nose of the shovel on the end of the extensible trough is continually moving back and forth with the conveyer, which puts a heavy load on the extensible trough and the entire conveyer trough line. The rock being heavy, the reciprocating nose of the shovel frequently rides over the top of the pile of loose material instead of sliding under the pile of loose material. Also the striking of the nose of the shovel on large heavy unyielding pieces of rock places high stresses on the extensible trough and the conveyer trough line, which in many cases causes buckling or breaking of the extensible trough, as well as the other troughs of the trough line.

The principal objects of my present invention are to improve upon the present form of extensible trough of a shaker conveyer by providing the shovel on the forward end of the extensible trough with a nose which may be advanced into the loose material as the extensible trough is advanced, but which forms a guide for the forward end of the extensible trough and remains stationary under the rock or ore during reciprocable movement of the extensible trough.

This and other objects of my invention will appear from time to time as the following specification proceeds and with reference to the accompanying drawings wherein:

Figure 2 is a view in side elevation of the forward end of the extensible trough of a shaker conveyer, with certain parts thereof shown in substantially longitudinal section;

Figure 3 is a detail longitudinal sectional view taken adjacent one end of the shovel in order to show certain details of the guiding connection between the shovel and the shovel nose;

Figure 4 is a detail view in side elevation of the forward end of the extensible trough of the shaker conveyer, with certain parts shown in substantially longitudinal section in order to show the details of the connection between the apron overlapping the end of the shovel and the shovel nose; and Figure 5 is a transverse sectional view taken substantially along line 5—5 of Figure 4.

Figure 1:
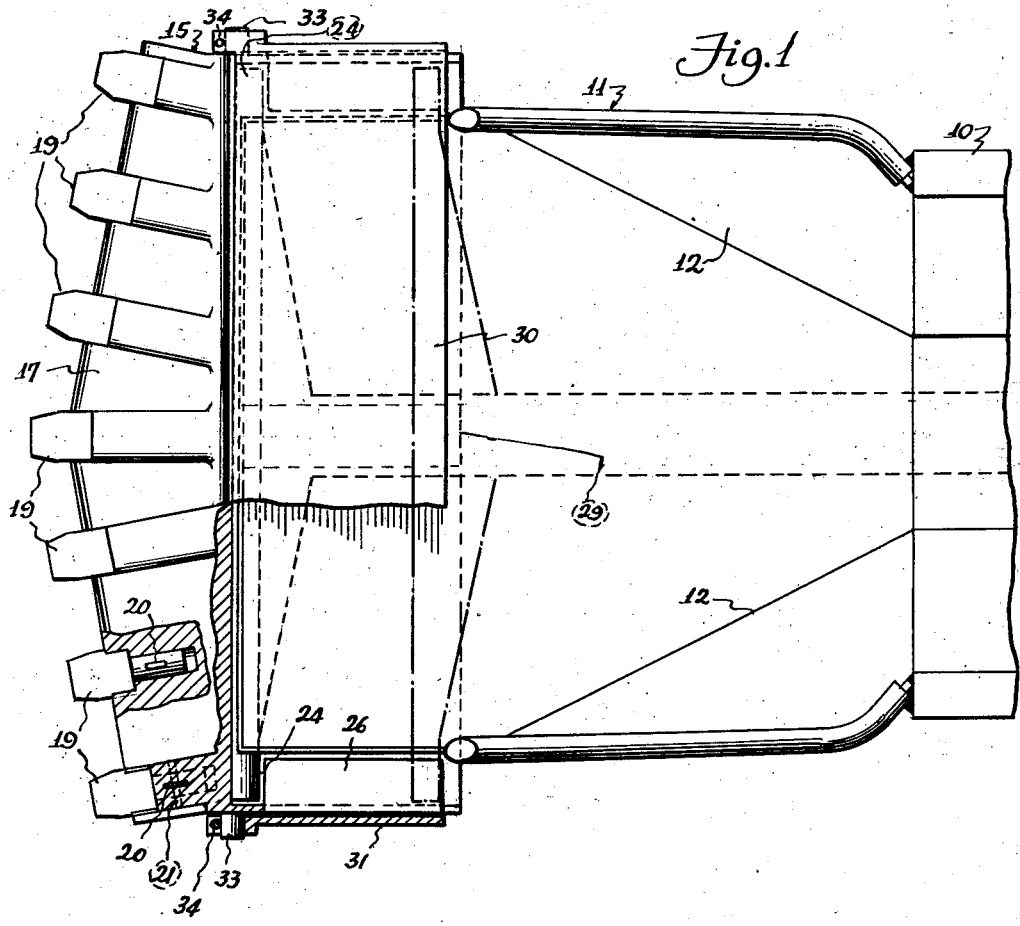
Figure 1 is a top plan view of the pick-up end of an extensible trough of a shaker conveyer, with certain parts broken away and certain other parts shown in horizontal section, in order to illustrate certain details of my invention.

Referring now to the drawings, an extensible trough 10 of a shaker conveyer is shown as having a shovel 11 forming a continuation of its forward end. A suitable feeding mechanism may be provided to extend said trough into the material it is desired to load, to pick up said material and convey it for discharge into mine cars or a main line conveyer at the mine entry. The feeding mechanism for extensibly or retractibly moving said extensible trough may be similar to that shown in the Bergmann Patent No. 2,186,472, of January 9, 1940, and is no part of my present invention so is not herein shown or described.

The shovel 11 has outwardly flared material retaining side walls 12, 12 forming a widened continuation of the sides of said extensible trough. Said side walls extend forwardly and downwardly to a relatively flat bottom plate 14 of said shovel, which is a forward continuation of the bottom of said extensible trough and which extends forwardly of the lower forward ends of said side walls and is slidably guided at its forward end in a nose 15 of said shovel. Said nose is adapted to remain stationary on the ground during reciprocable movement of said trough and to form a slidable support for said plate and the forward end of said trough. The nose 15 has a flat bottom portion 16, which is adapted to rest on the ground, and has a widened wedge-shaped forward end 17 which diverges rearwardly from the longitudinal center of the trough, and has digger teeth 19, 19 detachably mounted therein and extending therefrom, the points of which teeth are herein shown as being disposed adjacent the ground. Said digger teeth may be of any well known form detachably secured to the forward end of said nose as by means of keys 20, 20 locked in position by means of locking pins 21, 21.

Rectilinear guides 23, 23 extend along opposite sides of said nose above the bottom thereof, and are adapted to form guide means for opposite ends of a transverse shaft 24 secured to and extending across the forward end of the flat bottom plate 14 of said shovel. Said rectilinear guides are so arranged that the resultant thrust of said plate on said nose, during forward movement of said nose, effected by forward movement of said plate, is such that the digger teeth 19, 19 are forced downwardly to prevent said nose and shovel from climbing the pile of material it is desired to load.

The rectilinear guides 23, 23 each include a bearing plate 25 mounted on the upper sides of the bottom portion 16 of said nose, and an upwardly spaced retaining plate 26 spaced just above said bearing plate, in parallel relation with respect thereto. Movement of said bottom plate 14 with respect to said nose in a forward direction, is limited by an upright inner wall 27 of said nose, and movement of said bottom plate in an opposite direction is limited by the upturned rear ends of the bearing plates 25, 25. A bearing member 29 extending along the central portion of said nose is adapted to be slidably engaged by the central portion of the shaft 24, to form a bearing support therefor (see Figure 5).

An apron 30 is transversely pivoted to the nose 15 and extends rearwardly over the bottom plate 14 of the shovel 11 and rests on and slidably engages the upper surface of said bottom plate, to protect the forward end of said bottom plate and prevent dirt from accumulating in the guides 23, 23. Said apron has opposite depending parallel sides 31, 31 extending along the outer sides of the nose 15, which are slotted at their forward ends so as to open towards the forward end of said nose. The slotted portions of said sides are adapted to pivotally receive stub shafts 33, 33 extending outwardly from opposite sides of said nose. Pins 34, 34 extend through the forward portions of said sides 31, 31 above and below the slotted portions thereof, and abut the forward sides of the stub shafts 33, 33, to lock said apron to said stub shafts and to cause said stub shafts to form a pivotal mounting for said apron on said nose.

The nose 15 thus forms a guide track for the forward end of the extensible trough 10 during reciprocable movement thereof, and when said nose is buried under loose rock, the loads on said reciprocating extensible trough and the conveyer trough line are reduced from those which would be imposed if the entire shovel were reciprocating. This is due to the fact that the nose of the shovel is stationary under the loose material and that a greater part of the weight of the loose material is taken on the stationary nose and relieved from the reciprocating part of the shovel. Also, climbing of the shovel up the pile of loose material is minimized due to the fact that the resultant thrust imparted to said nose, during forward movement of said nose, is always in a direction to force the digger teeth 19, 19 downwardly.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a shaker conveyer loading device, a reciprocating trough having a shovel forming a continuation of its forward end and including a nose slidably connected with the forward end of said shovel so as to be advanced or retracted by extensible or retractible movement of said reciprocating trough, but remaining stationary during reciprocable movement of the conveyer when loose material is piled on said nose.

2. In a shaker conveyer loading device, a reciprocating trough having a shovel on its forward end, said shovel including a stationary nose adapted to rest on the ground and a material conveying portion forming a continuation of said reciprocating trough and a slidable guiding connection between said material conveying portion and said nose for guiding said material conveying portion for reciprocable movement with respect to said nose during operation of the conveyer.

3. In a shaker conveyer loading device, a reciprocating trough having a shovel on its forward end adapted to be extended into the material it is desired to pick up by extensible movement of said trough, said shovel including a nose adapted to rest on the ground and be extended into the loose material it is desired to load by movement of said trough, but remaining stationary during reciprocation of said trough when loose material is piled on said nose, and also including a material conveying portion forming a forward continuation of said trough and having slidable connection with said nose.

4. In a shaker conveyer loading device, a reciprocating trough having a shovel on its forward end adapted to be extended into the material it is desired to pick up by extensible movement of said trough, said shovel including a material conveying portion forming a continuation of said trough, a nose adapted to rest on the ground and be extended into the loose material it is desired to load by said trough, but remaining stationary during reciprocation of said trough when loose material is piled on said nose, and having a guide extending therealong, and a slidable connection between said guide and said material conveying portion of said shovel.

5. In a shaker conveyer loading device, a reciprocating trough having a shovel on its forward end adapted to be extended into the material it is desired to pick up by extensible movement of said trough, said shovel including a nose adapted to rest on the ground and having a wedge-shaped forward end inclined upwardly from the ground towards said trough, said shovel also including a widened material carrying portion forming a forward continuation of said trough and normally inclined with respect to the ground, and a slidable guiding connection between said nose and the forward end of said material carrying portion of said shovel arranged to hold the forward end of said nose in engagement with the ground during forward feeding movement of said nose into the material it is desired to load, to prevent said nose and shovel from climbing upon said loose material including a rectilinear guide extending along said nose closely adjacent and substantially parallel to the ground, and having the forward end of said material carrying portion of said shovel guided therein so the resultant thrust between said material carrying portion of said shovel and said nose will be towards the ground, upon advancing movement of said nose.

6. In a shaker conveyer loading device, a reciprocating trough having a shovel on its forward end adapted to be extended into the material it is desired to pick up by extensible movement of said trough, said shovel including a material conveying portion forming a forward continuation of said trough, a nose extending forwardly from said material carrying portion and adapted to be extended into the loose material it is desired to load by extensible movement of said trough, but remaining stationary during reciprocation of said trough when loose material is piled on said nose, said nose having a guide extending therealong, a slidable connection between said guide and said material conveying portion of said shovel, and an apron transversely pivoted to said nose and extending over said material conveying portion of said shovel, for preventing loose material from collecting in said guide.

7. In a shaker conveyer loading device, a reciprocating trough having a shovel on its forward end including a material conveying portion forming a continuation of the forward end of said trough, a nose extending forwardly of said material carrying portion and adapted to be advanced or retracted by extensible or retractible movement of said trough, but remaining stationary during reciprocable movement of the conveyer, said nose having a guide extending along each side thereof, and a slidable connection between opposite sides of said material conveying portion of said shovel and said guides.

8. In a shaker conveyer loading device, a reciprocating trough having a shovel on its forward end including a material conveying portion forming a continuation of the forward end of said trough, a nose extending forwardly of said material carrying portion and adapted to be advanced or retracted by extensible or retractible movement of said reciprocating trough, but remaining stationary during reciprocable movement of the conveyer, said nose having a guide extending along each side thereof, a slidable connection between opposite sides of said material conveying portion of said shovel and said guides, and an apron transversely pivoted to said nose and extending over said material conveying portion of said shovel for receiving the loose material dropping thereon and for preventing loose material from collecting in said guides.

9. In a shaker conveyer loading device, a reciprocating trough having a shovel on its forward end adapted to be extended into the material it is desired to pick up by extensible movement of said trough, said shovel including a nose adapted to rest on the ground and having a wedge-shaped forward end inclined upwardly from the ground towards said trough, said shovel also including a widened material carrying portion forming a forward continuation of said trough and normally inclined with respect to the ground, and a slidable guiding connection between said nose and the forward end of said material carrying portion of said shovel arranged to hold the forward end of said nose in engagement with the ground during forward feeding movement of said nose into the material it is desired to load, to prevent said nose and shovel from climbing up on said loose material, including a rectilinear guide extending along each outer side of said nose closely adjacent and substantially parallel to the ground, and a slidable connection between opposite sides of said material carrying portion of said shovel and said guides.

HERMAN R. EBERLE.